W. A. GIBBS & A. BORWICK.
Driers.

No. 134,659.

12 Sheets--Sheet 3.

Patented Jan. 7, 1873.

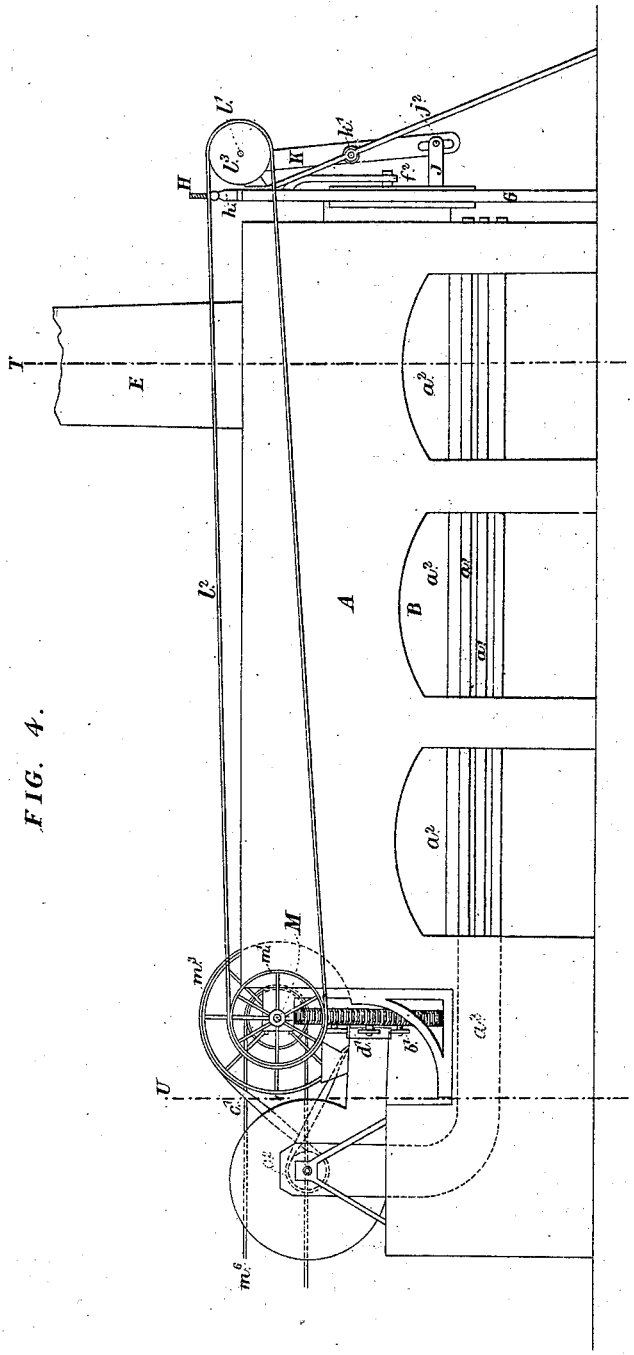

12 Sheets--Sheet 5.
W. A. GIBBS & A. BORWICK.
Driers.
No. 134,659. Patented Jan. 7, 1873.
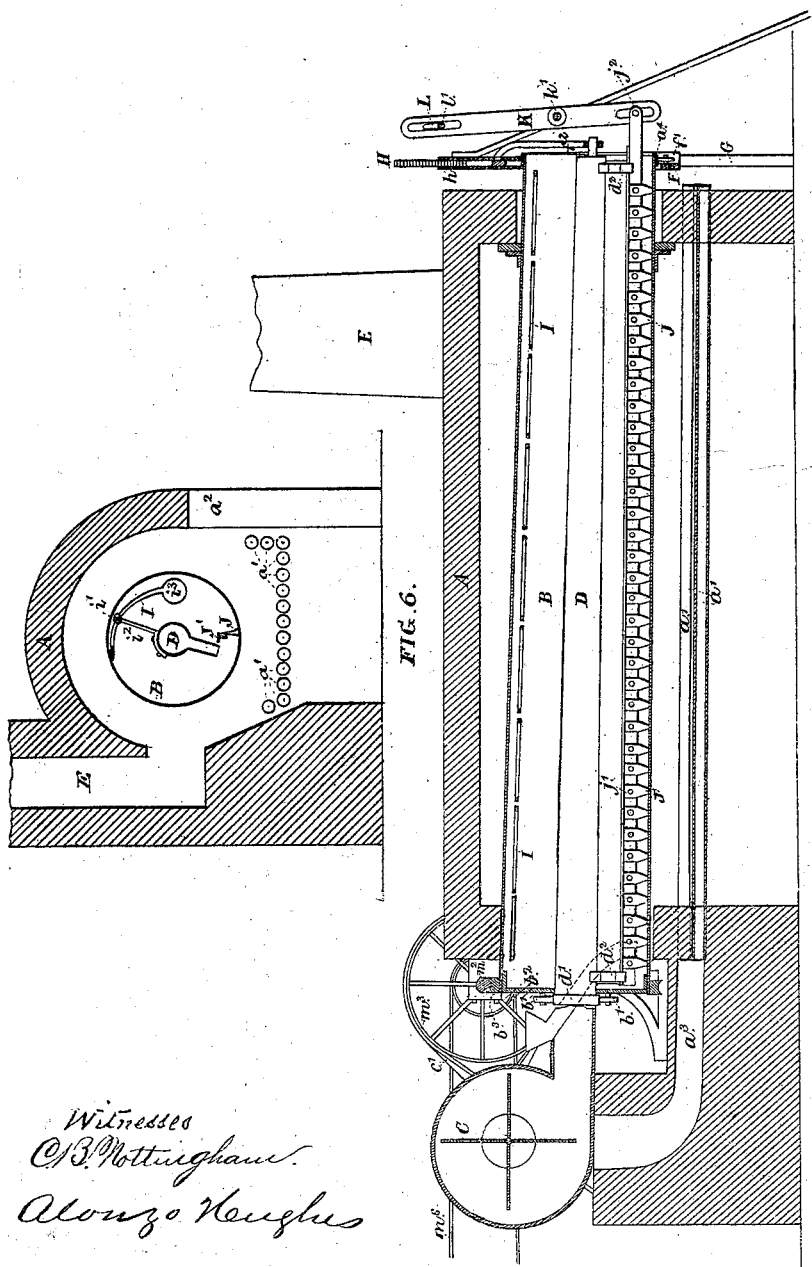

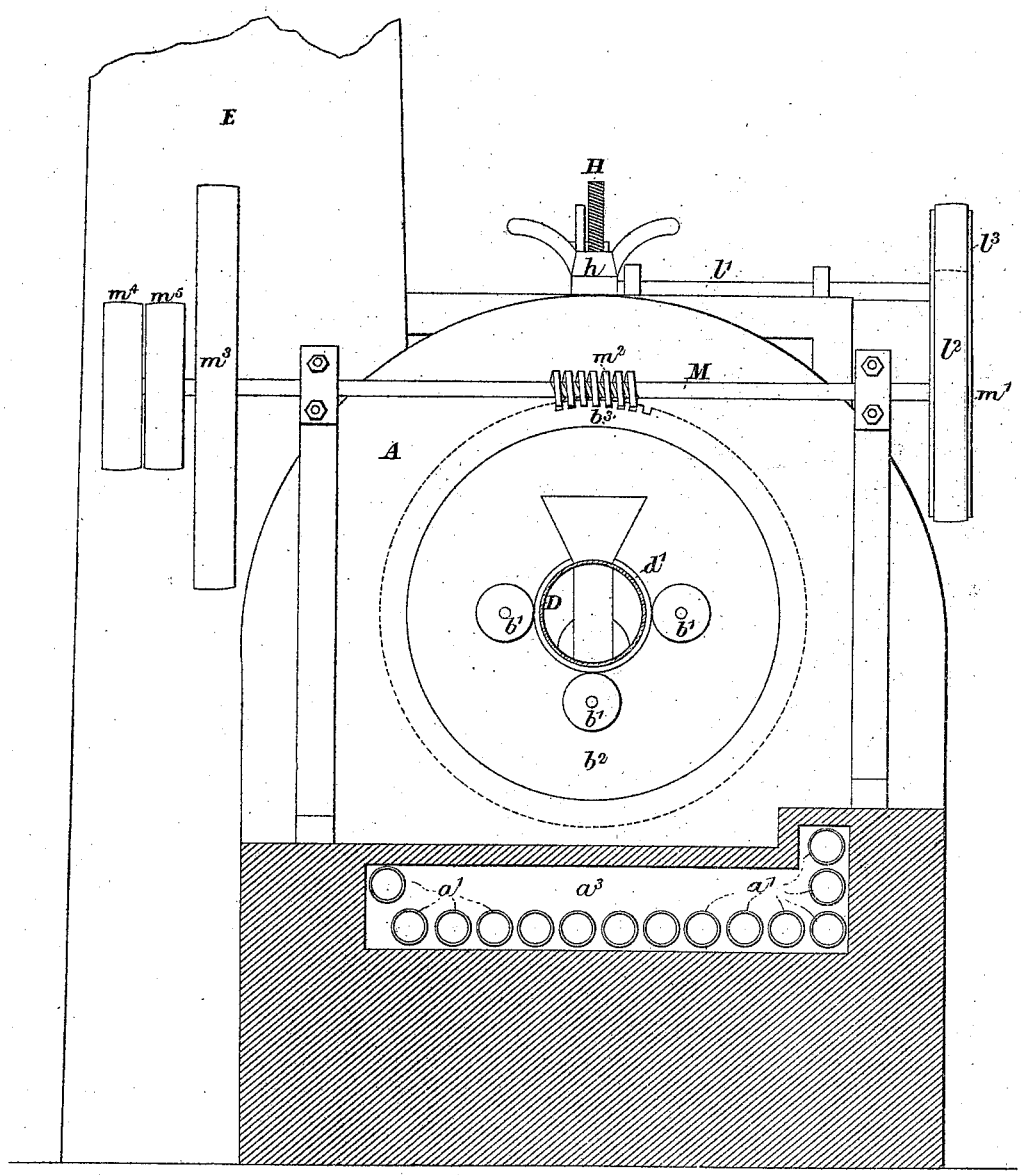

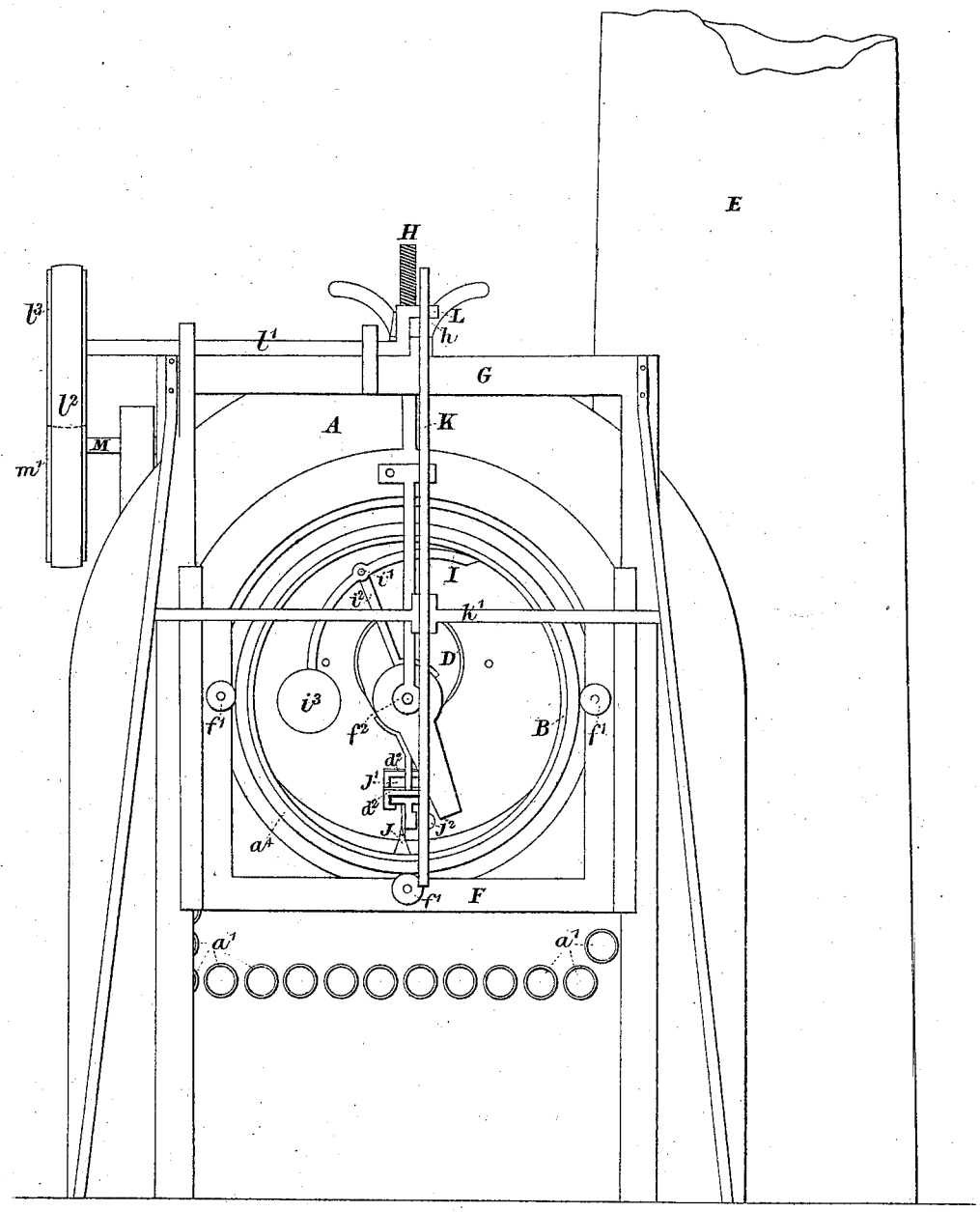

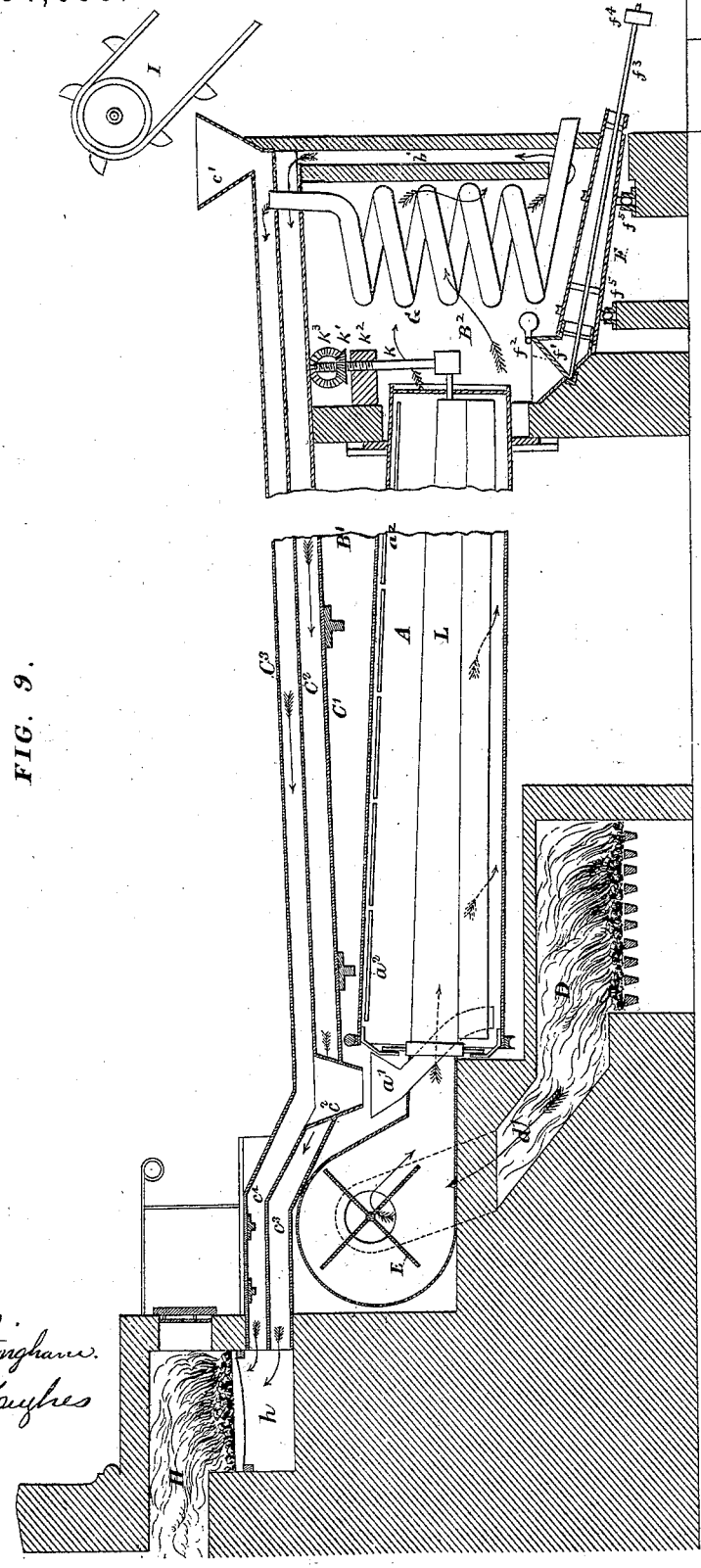

W. A. GIBBS & A. BORWICK.
Driers.
No. 134,659. Patented Jan. 7, 1873.

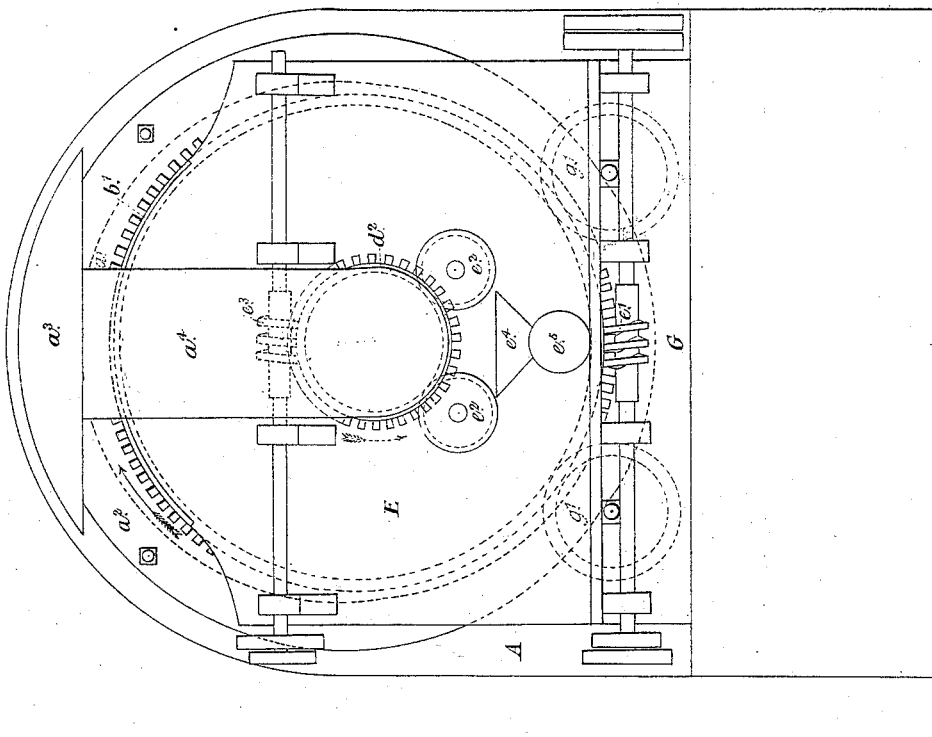
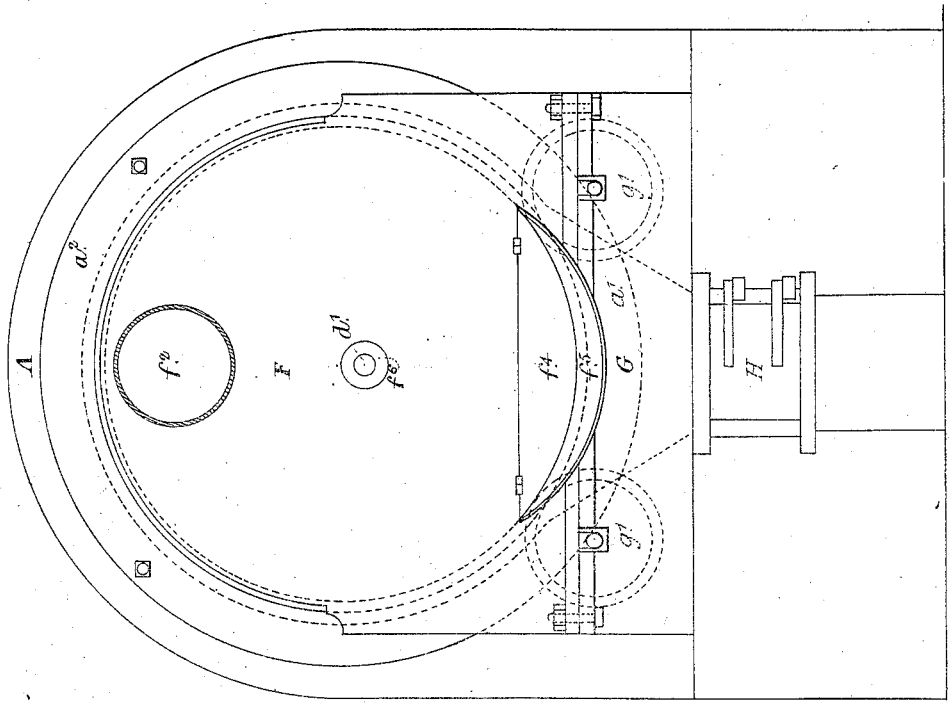

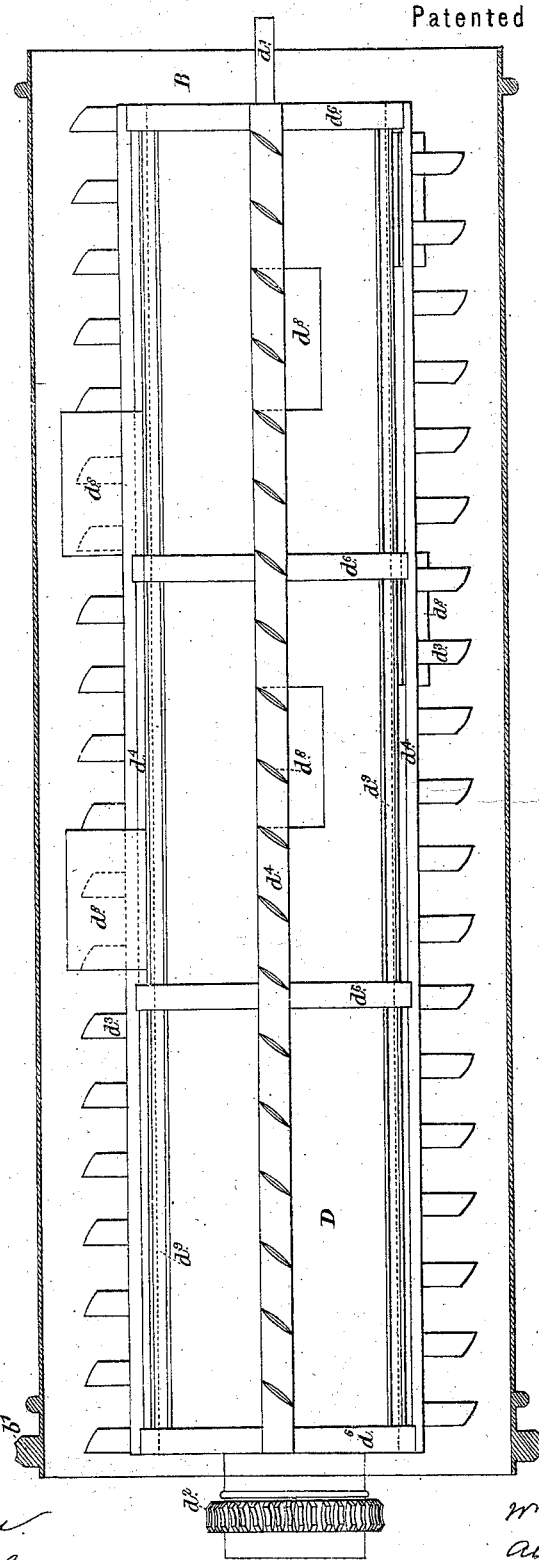

12 Sheets--Sheet 12.
W. A. GIBBS & A. BORWICK.
Driers.
No. 134,659. 　　　　　　　　　　　Patented Jan. 7, 1873.
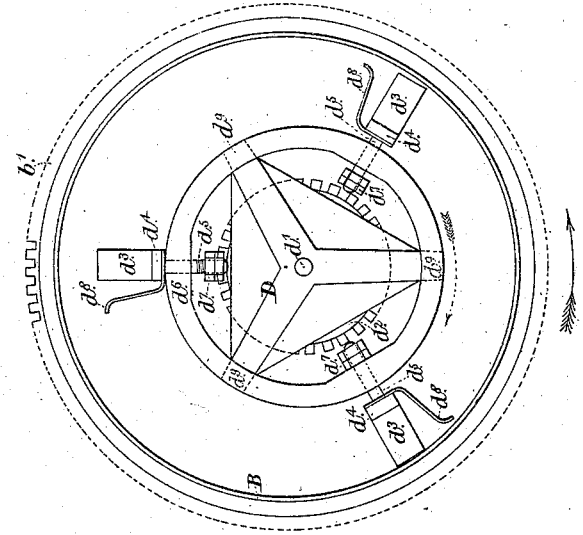
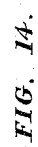
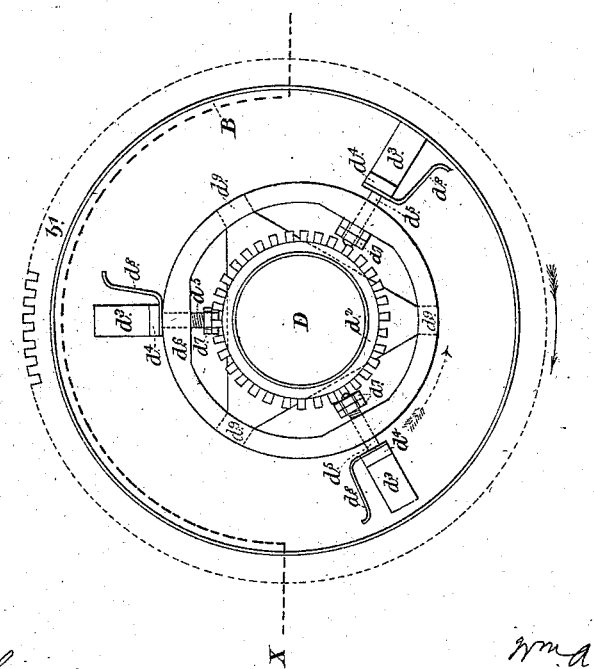

UNITED STATES PATENT OFFICE.

WILLIAM ALFRED GIBBS, OF GILLWELL PARK, SEWARDSTONE, AND ALFRED BORWICK, OF LONDON, ENGLAND.

IMPROVEMENT IN DRIERS.

Specification forming part of Letters Patent No. 134,659, dated January 7, 1873.

*To all whom it may concern:*

Be it known that we, WILLIAM ALFRED GIBBS, of Gillwell Park, Sewardstone, in the county of Essex, gentleman, and ALFRED BORWICK, of Lloyd's, in the city of London, gentleman, have invented certain Improvements in Apparatus and Arrangements for Drying, of which the following is a specification:

Our invention consists of the apparatus and arrangements hereinafter described and illustrated in the accompanying drawing, in which arrangements the matters to be dried are caused to pass through a revolving cylindrical or tapering case furnished with an air-duct, through which hot air is forced or drawn, the said air passing through a longitudinal slit or through longitudinal slits in the said air-duct, and being directed by lips at the sides of the said slit or slits onto the matters in the case.

We will describe our invention with reference to the accompanying drawing, with respect to which we would premise that where we describe parts in one figure which are represented in other figures we do not consider it necessary to recapitulate the description of such parts.

Figure 1:
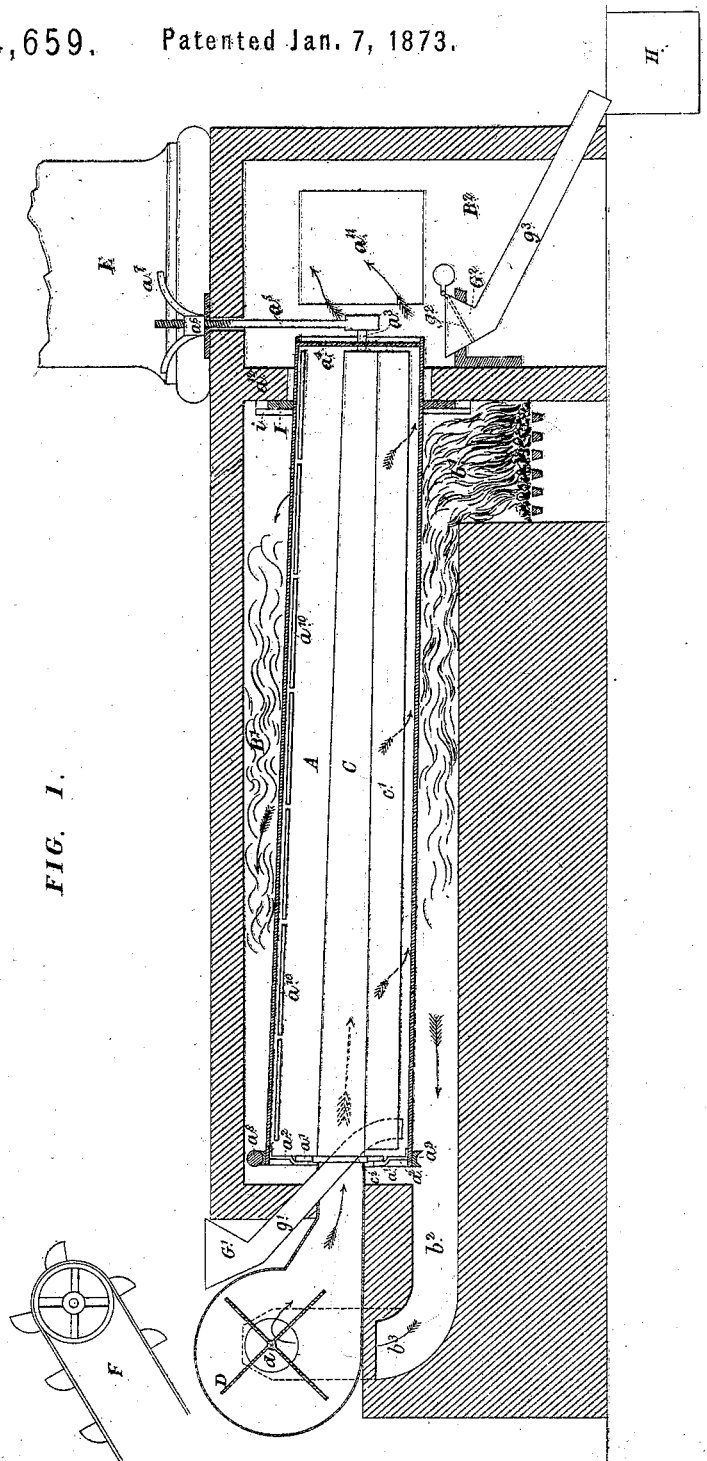

Figure 1 is a longitudinal vertical section of drying apparatus constructed according to one of the arrangements constituting our invention. A is a tapering case, which is mounted in a brick arch, $B^1$, and is furnished with an air-duct, C, which is constructed with a longitudinal slit, as represented in cross-section in Fig. 6 with respect to a similar air-duct, and lips $c^1$. On the larger end of this air-duct is fixed a ring, $c^2$, around which travel the friction-rollers $a^1 a^1$, which are carried by the brackets $a^2 a^2$ and support the larger end of the case A. The smaller end turns on an axis, $a^3$, which passes through a bearing in the bar $a^4$, one end of the said axis being affixed to stays in the air-duct and the other to an elevating-screw, $a^5$, which is adjusted, as required, by means of the screw-nut $a^6$ and handles $a^7$. The case A is caused to revolve by means of a worm, $a^8$, which gears with worm-teeth formed on a ring, $a^9$, carried by the case A, and is driven by means of a band-pulley outside the arch. $a^{10} a^{10}$ are the blades of scrapers, similar to those represented in end elevation in Figs. 6 and 8. These scrapers are used where sticky or viscous matters, such as sewage precipitates, starch, or cement, are to be dried, and are for the purpose of paring or scraping off the substance adhering to the case. $b^1$ is a furnace, the hot air from which passes first under and around the case A, then through the flue $b^2$ and the side flue $b^3$ to the eye $d$ of the fan D, by which the said air is forced through the air-duct C into and through the case A, whence the said air passes into an air-chamber, $B^2$, from which it passes through the flue $a^{11}$ to the chimney E, as indicated by the arrows. The matter to be dried is fed by an endless chain and bucket-elevator, F, into the hopper $G^1$, and passes through the spout $g^1$ thereof into the case A, which is set at such an inclination as to cause the said matter to travel through the case as it revolves, and the matter which has been dried during its passage through the said case falls from the lower end thereof into a hopper, $G^2$, (furnished with a counterbalanced valve, $g^2$, to prevent back draft,) and through the spout $g^3$ into the pit H. I is an oblong shutter mounted on the case A, which shutter slides up and down in a guide, $i$, at each side, and covers the space between the interior of the opening in the partition-wall $a^{12}$ and the exterior of the case, thereby preventing back draft.

Instead of heating the revolving case by means of a furnace under it, the said furnace may be built at the front of the apparatus, which may be so arranged that a portion of the hot air from such furnace shall pass through the air-duct into the case so as to heat the interior thereof, the other portion being caused to pass into the space between the said case and the arch aforesaid, thence back and into and through the said furnace, thence into and through the space aforesaid, and so on, a constant circulation of hot air being thus maintained so as to heat the exterior of the case.

Figure 2:
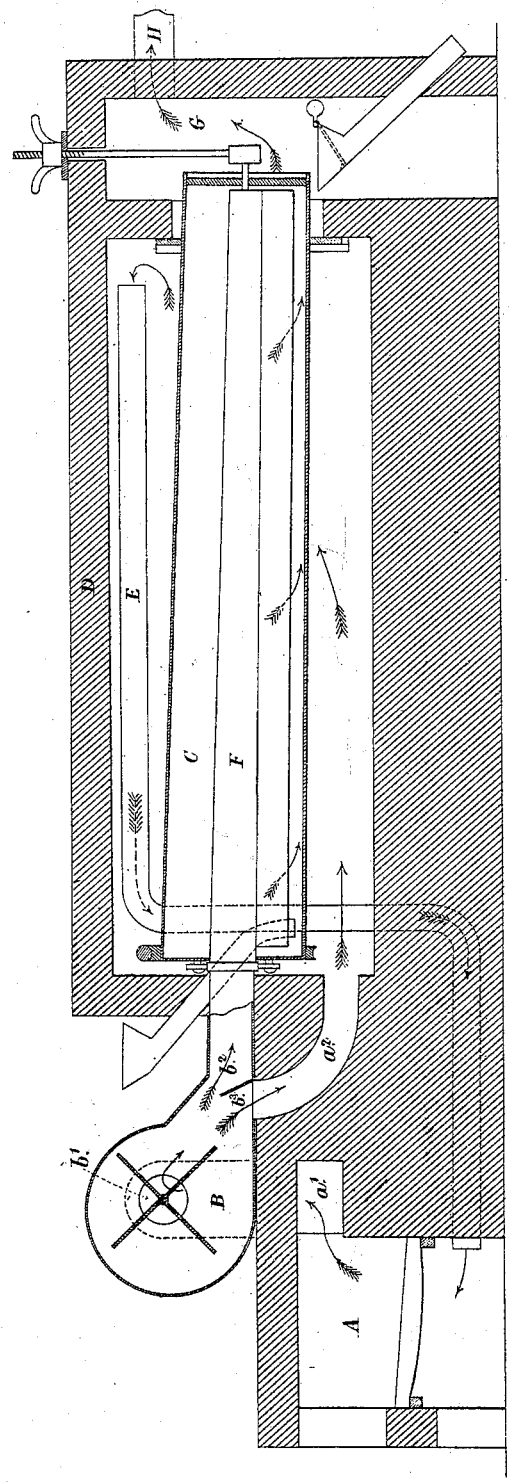

Fig. 2 is a longitudinal vertical section of drying apparatus constructed according to this modification. The furnace A is built at the front end of the apparatus, and the hot air from the said furnace passes through the side flue $a^1$ to the eye $b^1$ of the fan B. In the pipe $b^2$, which leads to the air-duct F, an adjustable deflecting-plate, $b^3$, is fixed, by which means a portion of the hot air is intercepted, and directed through the flue $a^2$ into the space between the case C and the arch D in which the said case revolves, whence such hot air, after parting with a portion of its heat, passes back through the pipe E to the furnace, in which such air is reheated, and from which it again passes to the fan. The other portion of the hot air passes into the air-duct F and case C, and thence into the air-chamber G, and escapes by the pipe H. The course of the hot air is indicated by arrows.

Figure 3:
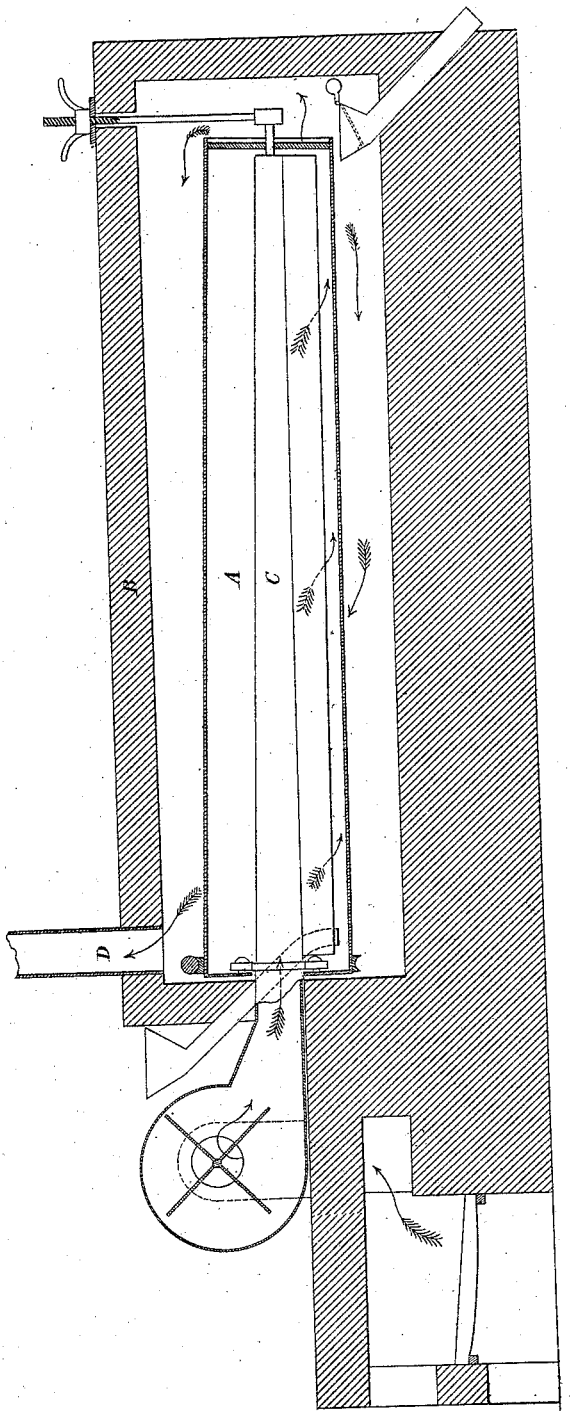

Fig. 3 represents, in vertical longitudinal section, drying apparatus, in which the case A is mounted in a closed brick arch, B, and the hot air from the furnace is caused to pass first into the air-duct C and case A, so as to heat the interior of the latter, and thence into the space between the arch B and the case A so as to heat the exterior of the said case, the said air escaping by the pipe D.

Instead of passing the hot air mingled with the other gaseous products of combustion, from the furnace into the air-duct, as in the arrangements hereinbefore described, the interior of the revolving case may be heated by hot air drawn through air-heating pipes, as hereinafter described with reference to Figs. 4 to 8, both inclusive, which represent drying apparatus constructed according to this part of our invention. Fig. 4 is a side elevation of the said apparatus. Fig. 5 is a longitudinal vertical section of the same. Figs. 6 and 7 are transverse vertical sections of the same, the said sections being taken, respectively, on the lines T U, Fig. 4; and Fig. 8 is an end elevation of the said apparatus, showing the arrangements for raising and lowering the revolving case and for working the scrapers hereinafter described.

Figs. 7 and 8 are drawn to a larger scale than the other figures in order the better to show the details.

A is the brick arch in which the revolving case B is mounted. $a^1$ $a^1$ are air-heating pipes, which also serve as furnace-bars, and support the fuel which is fed in at the stoke-holes $a^2$ $a^2$. The back ends of these pipes communicate with the external atmosphere, and the front ends lead into the flue $a^3$, by which the hot air is conducted to the fan C, whence it passes into the air-duct D and case B, from the lower end of which the said air escapes into the external atmosphere. The heat from the furnace passes around and impinges upon the exterior of the said case, and then escapes to the chimney E. The upper end of the case B, Fig. 7, is supported by friction-rollers $b^1$ $b^1$ carried by the annular plate $b^2$, which rollers travel around the ring $d^1$ on the air-duct D. On the lower end of the said case is affixed a ring, $a^4$, Fig. 8, which revolves on friction-rollers $f^1$ $f^1$, carried by the frame F, which slides in a gallows, G, which supports the screw H and screw-nut $h$, by means of which the case B may be adjusted at any required inclination, the lower end of the said screw being affixed to the frame F. I I, Figs. 6 and 8, are scrapers which are mounted upon longitudinal rods $i^1$ carried by standards $i^2$ affixed to the air-duct, and are furnished with counterbalances, $i^3$, which cause the blades of the said scrapers to bear against the interior of the case. J J, Fig. 5, are auxiliary scrapers, consisting of short iron blades riveted to a bar of T-iron, $j^1$, which slides longitudinally in guides $d^2$ $d^2$ affixed to the air-duct D. The lower parts of these blades are twisted to such an angle with the upper parts as to have a propelling action upon the matter which they scrape off the interior of the case. Reciprocatory motion is communicated to the bar $j^1$ by means of a slotted lever, K, which turns on an axis, $k^1$, and is worked by the crank L, the pin of which engages in the upper slot in the said lever, a pin, $j^2$, in the bar $j^1$ engaging in the lower slot. The crank-shaft $l^1$, Fig. 4, is driven by a band, $l^2$, passing from the band-pulley $m^1$ on the driving-shaft M to the band-pulley $l^3$ on the said crank-shaft. $f^2$ is an arm which supports the lower end of the air-duct. $m^2$, Fig. 7, is a worm formed on the driving-shaft M, which worm gears into teeth formed on a ring, $b^3$, affixed to the case B. $m^3$ is a band-pulley which drives the fan C by means of the band $c^1$ and pulley $c^2$. $m^4$ $m^5$ are fast and loose pulleys, the former of which is driven by means of a band, $m^6$, Fig. 4, from the driving-pulley of an agricultural or other engine.

The arrangement of the heating apparatus hereinbefore last described may be reversed so as to cause the hot air from the air-heating pipes to pass around and heat the exterior of the revolving case, the interior of the said case being heated by heat passing direct from the furnace.

In connection with a revolving case of the kind hereinbefore described, a double metal floor or casing, (preferably inclined,) through which the hot-air vapors from the said case pass on their way to a chimney-shaft, may be employed for drying sewage precipitates or other fluid matters fed onto the floor, in passing over which they become heated and lose some of their moisture. By this arrangement the otherwise waste heat may be economized to the utmost. From the drying-floor the matter to be dried passes into the case through the hopper thereof. A smaller revolving case may be mounted in the air-chamber in lieu of the fixed spout hereinbefore described. The draft over the drying-floor may be augmented by means of a current of air heated in its passage through a coiled pipe fixed in the air-chamber. The gases both from under and over the drying-floor may be made to pass through a supplementary furnace on their way to the chimney (or to the suction-fan where one is used) in order to burn them or render them innocuous.

Fig. 9 represents, in longitudinal vertical section, drying apparatus constructed according to this part of our invention. A is the revolving case, which is mounted in the chamber B¹ and communicates with the chamber B². C¹ C² C³ are three inclined planes of sheet metal, which constitute the double drying floor or casing and form the roof of the chambers aforesaid. D is the furnace by which the case A and the said drying-floor are heated. E is the fan; F is the supplementary revolving case; and $f^1$ is the hopper thereof, which hopper is furnished with the counterbalanced valve $f^2$. The case F (which has no air-duct) is carried by a spindle, $f^3$, which is driven by a band-pulley, $f^4$. $f^5$ $f^5$ are friction-pulleys which assist in supporting the said case. G is the air-heating coil, and H is the supplementary furnace hereinbefore referred to. The matter to be dried is fed by the endless chain and bucket-elevator I into the hopper $c^1$, whence such matter flows along the floor $C^2$, through the hoppers $c^2$ and $a^1$, to the case A, in which such matter is partially dried. The matter thus partially dried passes from the said case through the hopper $f^1$ to the revolving case F, in which the drying is completed. From this case the dried matter falls into the pit J. $a^2$ $a^2$ are the scraper-blades. K is the elevating-screw which passes through a female screw formed in the bevel-wheel $k^1$ which is supported by the bearing $k^2$ and worked by the bevel-wheel $k^3$, the shaft of which passes through the wall of the chamber B²; and is worked by a winch outside. The heat from the furnace D passes through the flue $d^1$ to the fan E; thence into the air-duct L and the revolving case A; thence into the air-chamber B², and up the flue $b^1$ under the drying-floor C². The said floor converges into two short flues, $c^3$ $c^4$, which lead into the ash-pit $h$ of the furnace H, through which both the waste heat from the furnace and the vapors from the floor C² pass into the said furnace, whence such gases as may remain undecomposed escape to the chimney M. The course of the hot air and vapors is indicated by arrows.

Several revolving cylinders or cases furnished with the air-ducts described may be combined in one apparatus. In this case the discharge ends of such cylinders or cases communicate with one and the same air-chamber, whence the hot air and the vapors may pass through a double drying-floor common to all the said cylinders or cases, and from the said floor to the chimney or suction-fan, the said hot-air and vapors being passed, if necessary, through the supplementary furnace hereinbefore described.

The air-duct employed may be either stationary, as hereinbefore described, or it may be caused to revolve in a direction contrary to that in which the cylinder revolves, and the said air-duct may be of any required section, and either have one slit furnished with lips, or two or more slits with or without lips. Where a revolving air-duct is employed we mount thereon, in lieu of the counterbalanced scrapers hereinbefore described, longitudinal bars, upon which scrapers are fixed at such an angle as to have a propelling action upon the matter in the case, the said bars being furnished with pins which slide radially in sockets carried by the air-duct, so that when, by its revolution, the said bars are caused to descend, they also slide outward by gravity until their scrapers bear against and scrape the interior of the cylinder or case and break up and propel the matter therein.

In order to assist in breaking up the said matter, spreaders or crushers may be affixed to the bars which carry the scrapers.

Figure 10:
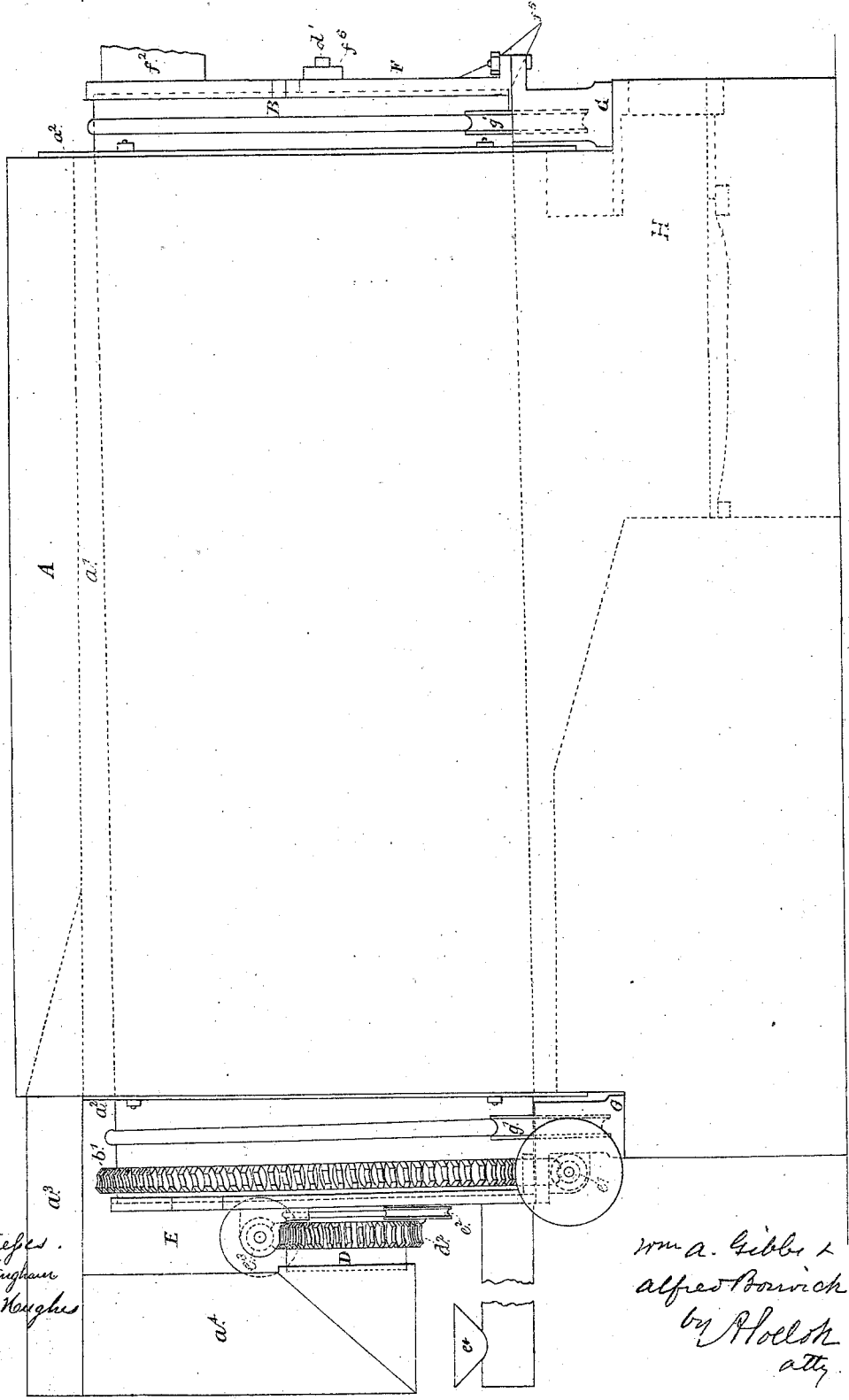

Figs. 10, 11, and 12 represent, in side elevation, back elevation, and front elevation, respectively, apparatus constructed according to the modifications hereinbefore last described, which apparatus is especially suitable for drying sticky or viscous matters, such as sewage precipitate or cement. Figs. 13, 14, and 15 represent the cylinder, air-duct, and scrapers separate from the brick arch or casing, Fig. 13 being a horizontal section taken on the line X, Fig. 14; Fig. 14, a front elevation; and Fig. 15, a back elevation. A, Fig. 10, is the brick arch or casing in which the cylinder B revolves in the direction indicated by the arrows, the said cylinder being driven by the worm $e^1$, which gears with worm-teeth formed on the ring $b^1$, carried by the cylinder. The ends of the cylinder are closed by the stationary plates E and F, which are bolted to the frames G, in which are mounted friction-wheels $g^1$ $g^1$, which carry the cylinder B. D, Figs. 14 and 15, is the air-duct, which revolves in a direction contrary to that of the cylinder's revolution, as indicated by the dotted arrows, and is supported at the small end by a pin, $d^1$, Fig. 10, working in a bearing, $f^6$, in the end-plate F, and is supported at the large end by friction-wheels $e^2$ $e^2$, carried by the end-plate E. Motion is given to the said air-duct by means of the worm $e^3$ gearing with the worm-teeth formed on the ring $d^2$ affixed to the air-duct. $d^3$ $d^3$, Figs. 14 and 15, are scrapers affixed to the bars $d^4$ $d^4$, which are furnished with pins $d^5$ $d^5$, which slide radially in sockets formed in rings $d^6$ $d^6$ affixed to the air-duct, the range of motion of the bars $d^4$ $d^4$ being regulated by means of the lock-nuts $d^7$ $d^7$. $d^8$ $d^8$ are spreaders or crushers which follow the scrapers $d^3$ $d^3$. The rings carrying the scrapers may be mounted on a separate shaft, to which a revolving motion is given, instead of being carried by the air-duct; and in this case the said air-duct may, preferably, be stationary. H, Fig. 10, is the furnace, the heated air and gaseous products of combustion from which pass through the flue $a^1$ around the cylinder B, and are prevented from escaping by the annular plates $a^2$ $a^2$ bolted to the brick arch A. From the flue $a^1$ the heated air passes by the casing $a^3$ and pipe $a^4$ to the air-duct D; thence through the slots $d^9$ $d^9$ to the interior of the cylinder, from which it passes to a chimney-shaft or exhaust-fan by the pipe $f^2$. $e^4$, Fig. 12, is a hopper formed on a pipe, $e^5$, through which the matter to be dried is fed into the cylinder B. An Archimedean screw may, if desired, be mounted in the pipe $e^5$ to facilitate the passage of such matters through the said pipe.

By reference to Figs. 13, 14, and 15 it will be seen that the air-duct consists of three plates of sheet metal, flat at the large end and bent at the small end of the said air-duct in such a manner as gradually to decrease the sectional area of the air-duct toward that end and to form three longitudinal slits or openings with lips, as shown.

Although we find this a convenient mode of construction, we do not limit ourselves thereto.

The cylinder B is or may be slightly inclined toward the feed end, in order that the matter to be dried, when in a fluid state, may not run forward.

The action of the apparatus is as follows: The matter to be dried is fed into the hopper $e^4$, and passes into the cylinder, where it is moved forward, as it dries, by the scrapers $d^3$ $d^3$, the spreaders or crushers $d^8$ $d^8$ breaking the lumps. When the matter reaches the end of the cylinder it pushes open the flap $f^4$ and falls down the lip $f^5$.

The several arrangements of revolving cases or cylinders and air-ducts hereinbefore described are applicable to the drying of sewage precipitates, artificial manures, chemical salts, starch, cement, mud, clay, and other matters; also to the drying of damp grain, seeds, brewers' grains, fresh or spent hops, malt, raw coffee, and other agricultural products.

It will, of course, be understood that the drying-floor hereinbefore described is applicable to the drying of such matters only as are sufficiently fluid to flow over the said floor.

Having now described the nature of our invention and the manner in which the same is to be performed, we wish it to be understood that we do not limit ourselves to the precise details hereinbefore described, as they may be varied without departing from the nature of our invention. Neither do we claim any of such details separately, except as hereinafter stated; but

We claim as our invention—

1. In a drying apparatus, the combination of a revolving drying case or cylinder with an air-duct provided with one or more longitudinal slits, and mounted or arranged in said cylinder or case, the latter being heated both internally and externally, as described, and the combination operating substantially as set forth.

2. The combination, in a drying apparatus, of a revolving drying case or cylinder and a revolving air-duct mounted or arranged in the same, substantially as shown and described, whether said air-duct has one longitudinal slit or several such slits.

3. The combination, with a revolving drying case or cylinder and a longitudinally-slitted air-duct mounted therein, of scrapers located within said case or cylinder, and operating substantially as shown and described.

4. The combination, with a revolving drying case or cylinder and an air-duct provided with one or more longitudinal slits and mounted therein, substantially as specified, of a drying-floor, substantially as described and shown in Fig. 9 of the accompanying drawing.

5. The combination, with a revolving drying case or cylinder and a longitudinally-slitted air-duct mounted therein, of the means herein described, or the substantial equivalent of the same, for supplying the heating agent to said air-duct and for heating said cylinder externally, substantially as shown and set forth.

WM. A. GIBBS.
ALFRED BORWICK.

Witnesses:
JAMES E. NAYLOR,
SAMUEL P. GUERNSEY.